(12) United States Patent
Voudouris

(10) Patent No.: US 10,939,981 B2
(45) Date of Patent: Mar. 9, 2021

(54) ORTHODONTIC BRACKET WITH SLIDING MOLAR DISTALIZER

(71) Applicant: SPARTAN ORTHODONTICS INC., Toronto (CA)

(72) Inventor: John Voudouris, Toronto (CA)

(73) Assignee: Spartan Orthodontics Inc., Toronto (CA)

(*) Notice: Subject to any disclaimer, the term of this patent is extended or adjusted under 35 U.S.C. 154(b) by 148 days.

(21) Appl. No.: 15/772,402

(22) PCT Filed: Oct. 31, 2016

(86) PCT No.: PCT/CA2016/051267
§ 371 (c)(1),
(2) Date: Apr. 30, 2018

(87) PCT Pub. No.: WO2017/070799
PCT Pub. Date: May 4, 2017

(65) Prior Publication Data
US 2018/0318048 A1    Nov. 8, 2018

Related U.S. Application Data

(60) Provisional application No. 62/248,020, filed on Oct. 29, 2015.

(51) Int. Cl.
*A61C 7/28* (2006.01)
*A61C 7/22* (2006.01)
*A61C 7/12* (2006.01)

(52) U.S. Cl.
CPC ............... *A61C 7/282* (2013.01); *A61C 7/12* (2013.01); *A61C 7/22* (2013.01); *A61C 7/28* (2013.01)

(58) Field of Classification Search
CPC .. A61C 7/282; A61C 7/12; A61C 7/22; A61C 7/28; A61C 7/00
USPC .......................................................... 433/18
See application file for complete search history.

(56) References Cited

U.S. PATENT DOCUMENTS

| | | | | |
|---|---|---|---|---|
| 3,690,003 | A * | 9/1972 | Gerber | A61C 7/12 433/18 |
| 5,727,941 | A * | 3/1998 | Kesling | A61C 7/282 433/17 |
| 6,217,322 | B1 * | 4/2001 | Kesling | A61C 7/282 433/17 |
| 6,976,839 | B2 * | 12/2005 | Lluch | A61C 7/00 433/18 |
| 2009/0061377 | A1 * | 3/2009 | Cope | A61C 7/00 433/18 |
| 2011/0244414 | A1 | 10/2011 | Lluch | |

(Continued)

*Primary Examiner* — Cris L. Rodriguez
*Assistant Examiner* — Mirayda A Aponte
(74) *Attorney, Agent, or Firm* — McMillan LLP

(57) ABSTRACT

A sliding molar distalizer is provided. The distalizer features a canine attachment bracket, a molar tube, and a rod connected to the bracket and having an engagement end for engaging the molar tube. A hook formed on a portion of the rod receives an elastic for imparting distalization force directly on the distalizer towards the molar tube. An orthodontic tube formed on the attachment bracket holds an archwire that passes through premolar brackets. A buccal push flange lever is formed at a distal portion of the rod for imparting force on the molar tube.

21 Claims, 10 Drawing Sheets

(56) References Cited

U.S. PATENT DOCUMENTS

2014/0335468 A1\* 11/2014 Dickerson ................ A61C 7/36
433/19

\* cited by examiner

ORTHODONTIC BRACKET WITH SLIDING MOLAR DISTALIZER

RELATED APPLICATIONS

This application claims priority from U.S. Provisional Patent Application No. 62/248,020 filed Oct. 29, 2015; the contents of which are herein expressly incorporated by reference.

FIELD OF THE INVENTION

The present invention relates to the field of orthodontic brackets, and more particularly to a sliding molar distalizer.

BACKGROUND OF THE INVENTION

A malocclusion is a misalignment or incorrect relation between the 2 jaws, maxilla and mandible, and the teeth of the respective two dental arches. This is often referred to as a skeletal dysplasia characterized by overjet of the upper jaw and upper incisors, and often requires cumbersome external headgear wear. There are generally three orthodontic terms to describe direction. Buccal-lingually means from the cheek side to the tongue side. Mesial-distally means from anterior to posterior or front to back. Occlusal-gingivally means from the bite side to the gum side. Malocclusion or malalignment of the bite, may be classified in one of three classes. Class I: Neutrocclusion where the molar relationship of the occlusion is within normal limits. This is described as the maxillary (or upper) first molar mesial cusp fitting into the central groove of the mandiubular (or lower) first molar, and where the other teeth may have additional problems such as spacing, crowding, or vertical alignment issues such as over or under eruption. Class II: Distocclusion where the mesiobuccal cusp tip of the upper first molar is anteriorly or forwardly positioned ahead of the mesiobuccal groove of the lower first molar and instead is anterior to it (often called a large "overbite" or technically a large overjet of the upper teeth anterior to the lower dentition). Again, the Class II can be a result of the skeletal components of the upper jaw (maxillary segment) and/or lower jaw (mandibular segment) being malaligned or may additionally involve the dentition being maligned (above). Class II also has two divisions where: Division 1 has molar relationships such as Class II with the anterior teeth protruding; and Division 2 has molar relationships like Class II but the central incisor teeth are retroclined and the lateral incisor teeth are seen anteriorly overlapping the centrals. It is important that the upper first molars are often and generally displaced and rotated mesially in Class II malocclusions taking up more space in the upper dental arch and contributing to the overjet, requiring correction. Class III: Mesiocclusion is found in patients where the upper molars are placed not in the lower molar mesiobuccal groove but where the upper molar is located posteriorly to the lower molar central groove and often referred to as an underbite.

A distalizer applies to the treatment generally, of the upper teeth and upper jaw with a Class II overjet condition above but can also be used in the lower jaw or teeth by reversing the direction of force to be used in the correction of a Class III malocclusion.

Distalizers have been used to correct one or more of the malocclusions described above. One such distalizer is described in U.S. Pat. Nos. 6,976,839; 7,238,022; and 7,618,257, which all disclose an auxiliary element for the segmented distalization of the posterior jawbone sector from canine to molar in orthodontic treatment. The orthodontic appliance or element includes two components: a mesial segment and a distal segment. The mesial segment is composed of a rectangular anterior bonded canine attachment with its bonding base attached and fixed to the enamel of the canine with bonding resin adhesive. This canine attachment has a buccally protruding anterior end, as a horizontal handle-like portion that facilitates retention of a separate elastic element placed by the patient individually that is stretched down to a separate mandibular first molar attachment on each side so as to produce a diagonally-directed interjaw and inter-arch force (between the maxillary and mandibular dental arches). This mesial component is finished off by an elongated and arched rod extension that is part of, and firmly attached off of the distal end of the bonded canine attachment. The other end of the rod has a flat, disk-shape with a lateral and centrally located hole opening, or orifice for a permanent pin that largely permits rotation in the bucco-lingual direction.

The distal component is a smaller distally (posteriorly) located element generally attached to the upper molar on each side of the upper jaw. The distal component is finished off by a shoe-shaped receptacle located in the middle portion with an outside base that attaches to the tooth. The rod's disk-shaped end member is coupled and permanently pinned with the shoe-shaped receptacle connecting the separate pin of the receptacle to the distal disk-shaped end of the mesial segment. The permanently welded pin on either side of the shoe receptacle where the pin is located in the center of the shoe passes through the housing orifice of the disk-shaped rod end. A projecting pivot of the receptacle cavity of the distal segment is placed within a lateral slot of the mesial segment to limit rotation of the flat disk-shaped member.

These distalizer mechanisms as described above are often complex and difficult to manufacture in three or four pieces with additional precision rotation pins through the rod connecting intricately to the distal component, and difficult to assemble. The projecting pivot and slot that limits rotation also increases difficulty in assembly. As two distalizers are used for balance in total, one on the left side and one on the right side of the upper jaw, a complex distalizer is cost prohibitive. Moreover, prior art distalizers are characterized by lateral rotation pins that fixed the mesial segment rod to the distal segment. These lateral pins result in the force on the mesial segment being applied, and being limited by the slot on the disk-shaped, located specifically on the lateral lingual surface due to the coupling with the receptacle of the distal segment. This lingual lateral contact of the lateral receptacle pin within the lateral slot of the disk-shape of the mesial segment also reduces the moment of force from the centre of resistance of the molar, (e.g. 94, FIG. 10A), for prior art distalizers. When the pins are replaced by lateral crimping of the receptacle in the distal segment of prior art distalizers, similar lateral contact forces are specifically established. Furthermore, when a force is applied at the level of the molar crown, the crown of the tooth begins to tip posteriorly, which can later, after treatment in retention, result in the tipped molar crown re-aligning itself under the forward position of the root. This is known as orthodontic relapse. In addition, the other more visible and common complications is that the upper canines can over-erupt due to the elastic traction that poses an aesthetic issue for patients. For this reason it is preferable and indicated in orthodontic biomechanics to translate the molar roots, or bodily move, the molar posteriorly by pushing distally closer to its center of resistance located near the roots.

SUMMARY OF THE INVENTION

In accordance with one aspect of the invention there is provided an orthodontic appliance for orthodontic treatment of a posterior maxillary sector extending from a canine tooth to a molar tooth on the same side of the maxilla comprising: a molar tube affixed to a molar tooth and having an opening on the mesial side to an interior of the molar tube; a canine attachment bracket component affixed to a canine tooth; a curved rod extending from the canine attachment bracket component towards the molar tube in a mesiodistal direction; and a hook, located on the canine attachment bracket component or on the curved rod, for attachment to a traction elastic; wherein a distal end of the curved rod engages at least one surface of the molar tube, such as the distal surface, to exert a distal force on the molar tooth when under a force of the traction elastic on the hook.

The orthodontic appliance may comprise an engagement feature at the distal end of the curved rod, and the engagement feature may be coupled to a retention feature in the molar tube. The hook may be located on the curved rod between the canine attachment bracket component and the molar tube. The hook may also be on a curved portion of the rod. The hook may be smooth in order to reduce catching on the inside of a patient's cheek.

The canine attachment bracket component may comprise an orthodontic tube containing an archwire slot therethrough in the mesiodistal direction. The archwire slot may be sized for permitting the insertion of an archwire to pass generally mesiodistally from the canine attachment bracket into at least one premolar bracket.

The orthodontic appliance may further comprise a buccal push flange lever, located at the distal portion of the curved rod for engaging a mesial end of the molar tube, when the curved rod is moved distally under the force of the traction elastic. The buccal flange lever may be buccally offset with respect to the curved rod such that the buccal flange lever engages a mesial edge of a buccal wall of the molar tube when the curved rod is moved distally under the force of the traction elastic.

The engagement feature of the orthodontic appliance may have a generally spherical shape, and the retention feature on the molar tube may be a spherical void sized slightly larger than the engagement feature. Alternatively, the engagement feature may have a generally ellipsoidal shape and the retention feature may be a generally ellipsoidal void sized slightly larger than the engagement feature.

In accordance with another aspect of the invention, there is provided an orthodontic appliance for orthodontic treatment of a posterior maxillary sector extending from a canine tooth to a molar tooth on the same side of the maxilla, comprising: a molar tube affixed to a molar tooth and having an opening on the mesial side to an interior of the molar tube and an aperture on the distal side; a canine attachment bracket affixed to a canine tooth; a curved rod extending from the canine attachment bracket in a mesiodistal direction; and a hook, located on the canine attachment bracket or on the curved rod, for attachment to a traction elastic; wherein the curved rod passes through the molar tube entering at the opening and exiting at the aperture; and wherein a distal end portion of the curved rod frictionally engages the molar tube to exert a distal force on the molar tooth when under force of the traction elastic on the hook.

The curved rod may comprise a blocking feature at a distal end thereof for preventing the curved rod from being removed from the molar tube. The hook may be located on the curved rod between the canine attachment bracket and the molar tube, and more specifically the hook may be located on a curved portion of the rod. The hook is preferably smooth in order to reduce catching on the inside of a patient's cheek. The canine attachment bracket may comprise an orthodontic tube containing an archwire slot therethrough in the mesiodistal direction. The archwire slot may be sized for permitting an archwire to pass generally mesiodistally from the canine attachment bracket into at least one premolar bracket. A buccal flange lever may be located at the distal portion of the curved rod, for engaging a mesial end of the molar tube when the curved rod is moved distally under the force of the traction elastic on the hook.

In any of the above aspects of the invention, the curved rod may taper at the distal end, the opening of the molar tube may be generally rectangular in shape with round corners internally and externally, and the interior of the molar tube may taper in a mesiodistal direction from the opening. The interior of the molar tube may be shaped like a pyramid with round corners, a prism with round corners, or a funnel or cone with rounded end corners. The opening of the molar tube may be narrower in an occlusal-gingival direction than in a buccal lingual direction. Alternatively, the opening of the molar tube may narrow in the buccal-lingual direction and in the mesial to distal reaction, and may be relatively rectangular in shape through a cross sectional view in an occlusal-gingival direction. The curved rod may engage a tapered end of the interior of the molar tube. The tapered end of the curved rod may initially align with the buccal wall of the molar tube, and during distalization treatment may become aligned with the lingual wall of the molar tube. The molar tube may comprise at least one restriction feature maintaining the engagement feature within the retention feature.

The orthodontic appliance may also comprise at least one premolar bracket bonded to at least one premolar, and an archwire placed in the canine and passing through the at least one premolar bracket.

In yet another aspect of the present invention, there is provided an orthodontic appliance for orthodontic treatment of a posterior maxillary sector extending from a canine tooth to a molar tooth on the same side of the maxilla. The orthodontic appliance comprises: a molar tube affixed to a molar tooth and having an opening on the mesial side to an interior of the molar tube; a canine attachment bracket affixed to a canine tooth; a curved rod extending from the canine attachment bracket; and a hook, located on the canine attachment bracket or on the curved rod, for attachment to a traction elastic; wherein the curved rod engages the molar tube to exert a distal force to the molar tooth when under the force of the traction elastic.

The curved rod may comprise an engagement feature coupled to a retention feature of the molar tube. The hook may be located on the curved rod between the canine attachment bracket and the molar tube. The hook may also be located on a curved portion of the rod. The hook is preferably smooth in order to reduce catching on an inside of a patient's cheek. The canine attachment bracket may comprise an orthodontic tube containing an archwire slot therethrough in the mesiodistal direction. The archwire slot may be sized for permitting the insertion of an archwire to pass generally mesiodistally from the canine attachment bracket into at least one premolar bracket.

A buccal flange lever may be located at the distal end of the curved rod for engaging a mesial end of the molar tube when the curved rod is moved distally under the force of the elastic on the hook. The buccal flange lever may be buccally offset with respect to the curved rod such that it aligns with a mesial edge of a buccal wall of the molar tube when the curved rod is moved distally under the force of the traction elastic. The engagement feature may be either spherical or ellipsoidal in shape, and the corresponding retention feature may be a spherical or an ellipsoidal void, respectively, each having a size slightly larger than the corresponding engagement feature. The engagement feature may also be generally D-shaped and the retention feature may be a generally sinusoidal void with at least two chambers sized slightly larger than the engagement feature. The buccal flange lever may engage the mesial end of the molar tube before the engagement feature abuts the back wall of the molar tube in any and all embodiments described herein using a buccal flange lever.

BRIEF DESCRIPTION OF THE DRAWINGS

The novel features which are believed to be characteristic of the present invention, as to its structure, organization, use and method of operation, particularly in terms of improved proximity to the 3 main centers of resistance of the upper jaw and teeth, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1:
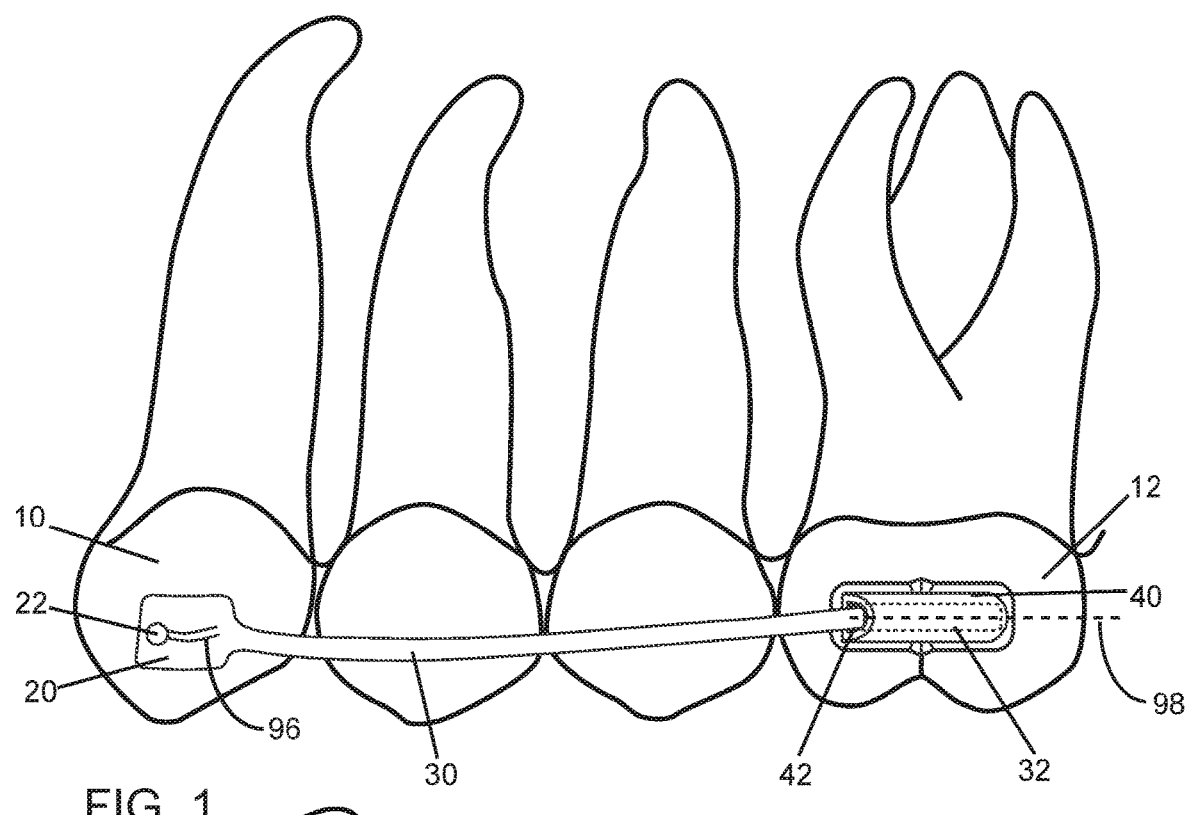
FIG. 1 is a buccal view of the upper middle and posterior teeth with a sliding distalizer in accordance with an embodiment of the present invention.

With reference to FIG. 1 to FIG. 6, a sliding distalizer is provided. The sliding distalizer comprises an angled rhomboid or rectangular-shaped attachment bracket 20 affixed to a canine tooth 10. The attachment bracket 20 has a ball hook 22, to attach a separate traction force elastic (not shown) to a lower molar at a diagonal in order to exert force on the attachment bracket 20. The ball hook 22 is smooth in order to reduce catching of the hook 22 on the inside of the patient's cheek. The attachment bracket 20 may be integrally formed at, or attached to, a portion of a long rod 30 that extends towards the back of the mouth in a mesiodistal direction. The rod 30 is slightly curved in the buccal-lingual plane, but relatively straight in the gingival-occlusal plane. The rod 30 enters an upper molar tube 40, affixed to a molar tooth 12, via a wide opening 42 on a mesial side, more clearly shown in FIG. 4 to FIG. 6. The upper molar tube 40 may be shaped so that opening 42 is generally rectangular or may have other suitable shapes, such as an initially flared funnel, an oval, an elliptical, or a round shape, and opening 42 may have a corresponding shape all with rounded internal and external edges. The rod 30, in some embodiments, has a tapered distal end 32 opposite the attachment bracket 20, but may be otherwise shaped to engage the interior 44 including the back of the molar tube 40. The rod 30 and molar tube 40 can be made of stainless steel, chromium-cobalt, or titanium etc., or alloys that combine several types of metals.

Figure 1B:
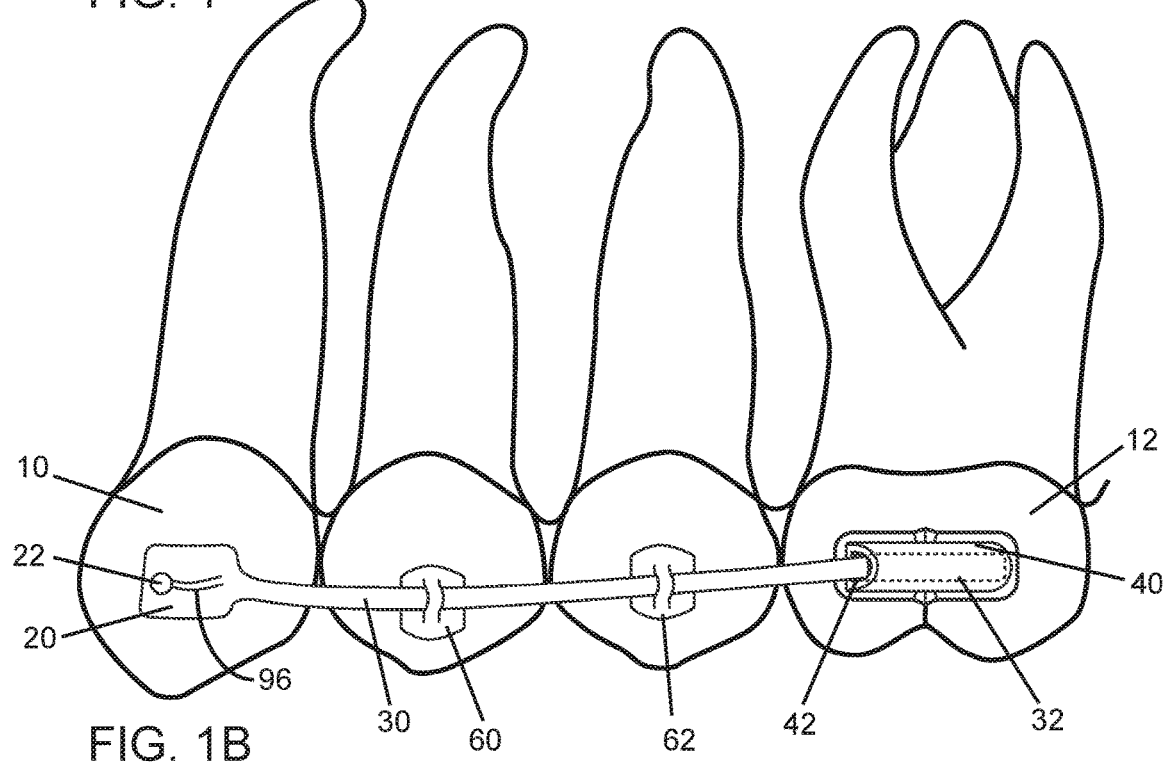
FIG. 1B is a buccal view of the upper middle and posterior teeth with a variation of the sliding distalizer of FIG. 1 along with intermediary anchor guides.
Figure 2:
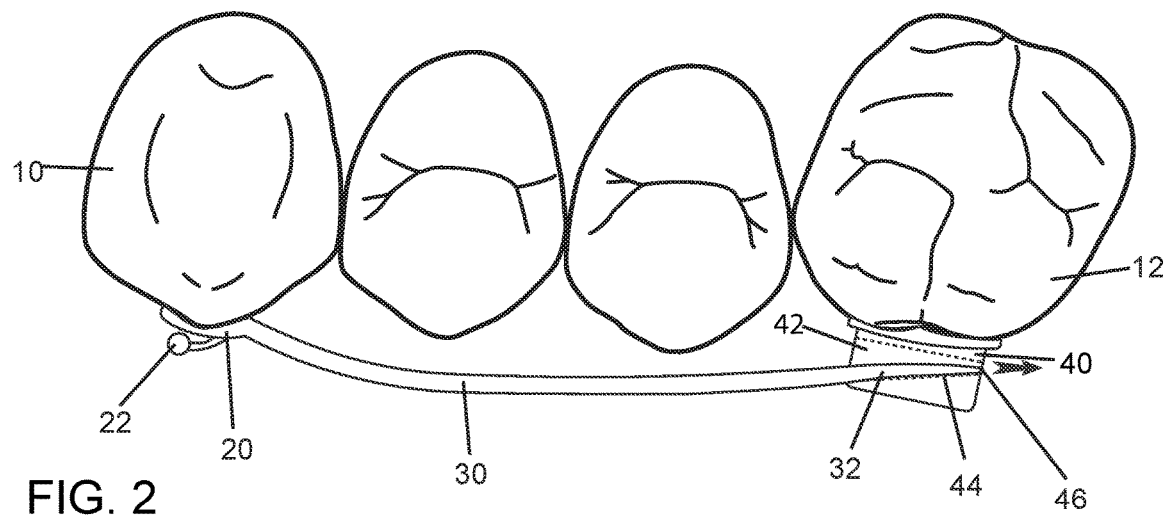
FIG. 2 is an occlusal view of the sliding distalizer of with a cross-section through the molar tube at reference line 98, of FIG. 1 on the upper teeth at an initial phase.

In another embodiment shown in FIG. 1B, additional anchor-loop guides 60 and 62 may be bonded to the premolars to accommodate the rod 30 supported by anchor-loops formed on the guides. The rod 30 slides through guides 60 and 62 to allow natural distal drift of the premolars and secondly to reduce or prevent the complication of inadvertent canine tooth extrusion in the prior art due to the vertical inter-arch elastic force component, 96, on the canine tooth 10. The premolar anchor-loop guides may be additionally self-ligating to enable easy removal of the rod 30.

In FIG. 2 to FIG. 6 the interior 44 of the molar tube 40 tapers (shown through a reference plane 98 in FIG. 1 as dot-dashed lines) in a mesiodistal direction from the wide anterior or mesial molar tube opening 42. During initial treatment, better shown in FIG. 2, the tapered distal end 32 of the rod 30 generally aligns close with the buccal wall of the interior 44 of the molar tube and applies a mild distal force initially to the tapered back or distal wall 46 of the interior 44. The rod 30 causes the molar 12 to slide distally towards the back of the mouth.

Figure 3:
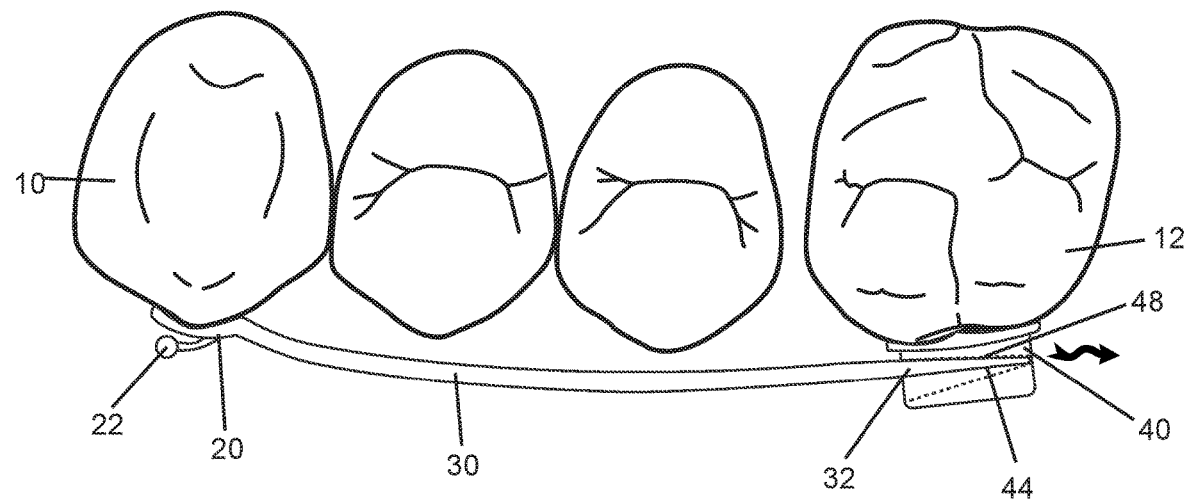
FIG. 3 is an occlusal view of the sliding distalizer with a cross-section through the molar tube at reference line 98, of FIG. 1 on the upper teeth that shows a distalization with mild sinusoidal lingual movement of the distal aspect of the upper molar.

Since the upper molar 12 has one large root on the palatal side and two small roots on the buccal or buccal side, the molar 12, during treatment, begins to move directly distally and partially rotate distally for a combined, overall distal sinusoidal movement. The molar is observed to largely distalize (move posteriorly) as shown in FIG. 3. As the molar 12 distalizes and rotates, the tapered rod 30 continues to slide the molar 12 distally and gradually aligns approximately with the lingual wall 48 of the interior 44 of the molar tube 40. Once the rod 30 aligns with the lingual wall 48, the rod 30 stops any partial rotation of the upper molar 12, however, the upper molar 12 continues to slide distally.

Figures 4, 5:
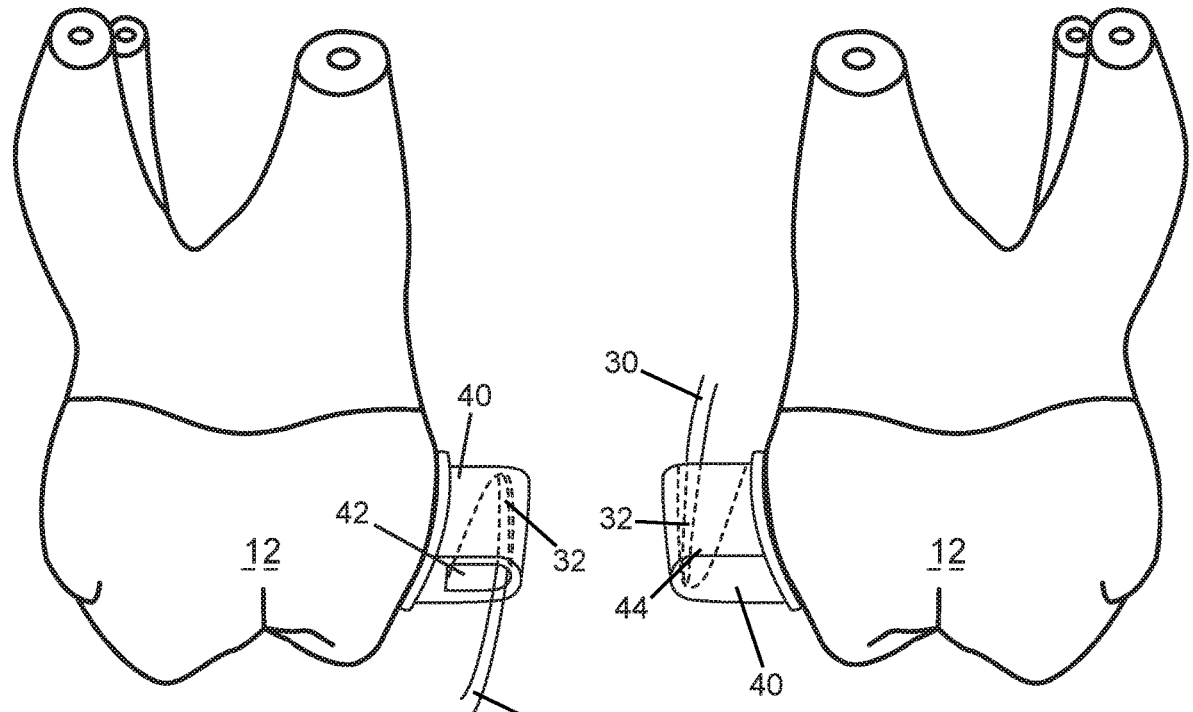
FIG. 4 is a mesial perspective view showing a distal rod end engaging the upper molar tube of the sliding distalizer of FIG. 1, and initially also aligning close to the buccal surface of the upper molar tube with the distal rod end contacting the distal back wall of the upper molar tube.
FIG. 5 is a distal perspective view showing the upper molar tube of the sliding distalizer of FIG. 1, and how the distal rod end contacts the distal back wall part of the upper molar tube.
Figure 6:
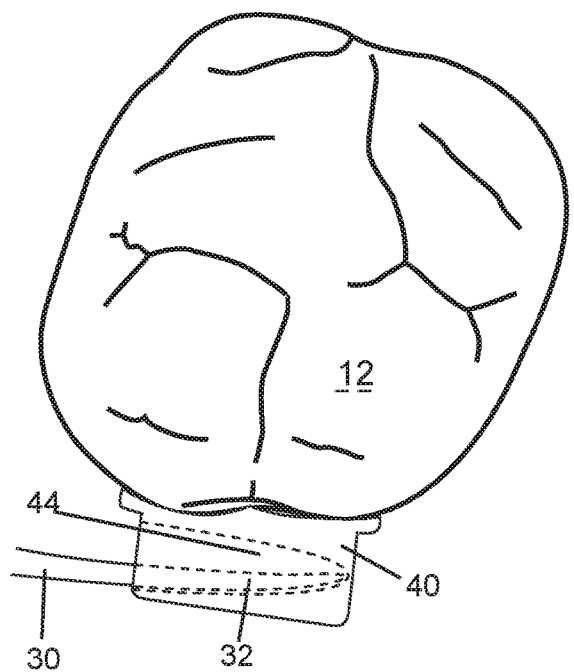
FIG. 6 is an occlusal view of the upper molar tube of the sliding distalizer with a cross-section through the molar tube at line 98 of FIG. 1, showing the conical, funnel-shape of the tube opening (dotted lines), and how the distal rod end engages the distal back wall of the upper molar tube attached to an upper molar.

FIG. 4 and FIG. 5 are mesial and distal views, respectively, showing distal rod end 32 engaging the upper molar tube 40 of the sliding distalizer, and initially also aligning approximately with the buccal wall of the upper molar tube. FIG. 6 is an occlusal view of the upper molar tube 40 of the sliding distalizer, with a cross-section showing the funnel-shape of the tube opening 44 (in dotted lines), and how the distal rod end 32 engages the back distal wall of the upper molar tube 40 attached to an upper molar 12.

Figure 7A:
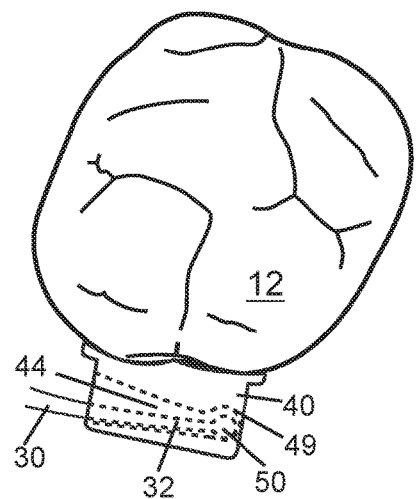
FIG. 7A is an occlusal view of an upper molar tube of a sliding distalizer, with a similar molar tube cross-section as in FIG. 6, showing a distal rod end having a spherical engagement feature engaging a spherical and funneled, keyhole void retention feature of an upper molar tube attached to an upper molar, in accordance with another embodiment of the present invention.
Figure 7C:
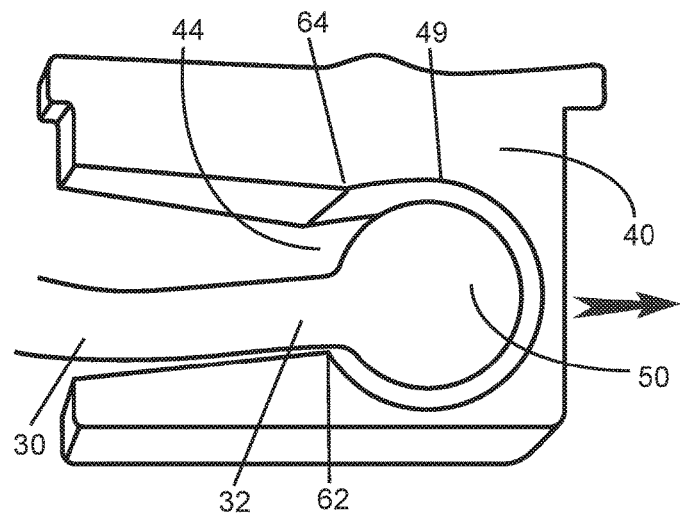
FIG. 7C is an enlarged horizontal cross-sectional perspective view of the upper molar tube that includes the distal rod end having the spherical engagement feature coupled to a retention feature of the upper molar tube in the form of a funneled, keyhole clasp, pushing distally on the back wall of the upper molar tube, in accordance with yet another embodiment of the present invention.
Figure 7B:
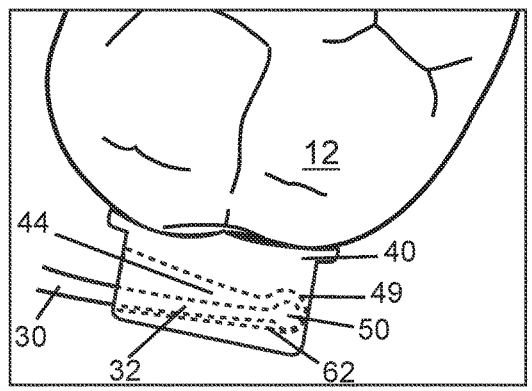
FIG. 7B is an enlarged version of FIG. 7A.

Turning now to FIG. 7A and FIG. 7B which are occlusal views of an upper molar tube 40 of a sliding distalizer, with a cross-section showing a distal rod end 32 having an engagement feature 50 engaging a retention feature 49 of an upper molar tube 40 attached to an upper molar 12, in accordance with another embodiment of the present invention. Engagement feature 50 may have a generally spherical shape, and may be integrally formed on, or attached to, the distal end 32 of the rod 30. The rod 30 may be held in the molar tube 40 by the engagement feature 50 being held in place by the corresponding retention feature 49 of the molar tube 40, such as a spherical void sized slightly larger than the engagement feature 50. The retention feature 49 may have at least one restriction feature 62, (and/or 64) that maintains the engagement feature 50 within the retention feature 49. The restriction feature 62, and/or 64 may have flanges or a narrowing that maintains the engagement feature 50 within the retention feature 49 until a sufficient force is applied. When a sufficient mesial force is applied, the engagement feature 50 cannot overcome the restriction features 62, 64 permitting the engagement feature 50 to be retained and engage the retention feature 49 firmly. The spherical shape additionally may be magnetized for retention.

FIG. 7C is an enlarged perspective view of the distal rod end 32 having the spherical engagement feature 50 coupled to a retention feature 49 of an upper molar tube 40 in the form of a funneled keyhole-clasp 49, in accordance with yet another embodiment of the present invention. The funneled keyhole-clasp 49 may feature at least one restriction feature 62, or 64 as described above.

Figure 7D:
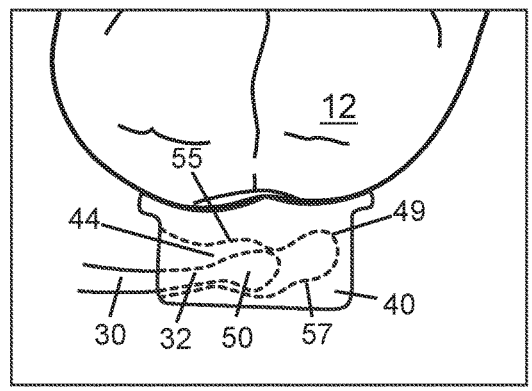
FIG. 7D is an enlarged horizontal cross-sectional occlusal view of a D-shaped distal rod end and a sinusoidal retention feature of the upper molar tube following movement of the distal end of the rod, for supplemental distalization

FIG. 7D is an enlarged cross-sectional occlusal view of an upper molar tube 40 in accordance with another embodiment of the present invention, of a sliding distalizer showing a distal rod portion having an essentially D-shaped engagement feature 50 that engages a sinusoidal retention feature 55 within the molar tube 40. Following a first phase of initial molar distalization (not shown), the D-shaped engagement feature 50 has slid mesially out from the initial most distal void 49 (dotted line away from with initial retention wall 57), and into the second void 44 in a mesial direction. The engagement feature 50 begins to push distally once again on retention feature wall 55 for a supplemental second phase of the molar tube 40 to maximize distalization.

Alternatively, in yet another embodiment, the engagement feature 50 and the retention feature 49 may be larger in one dimension than another direction, such as a generally ellipsoidal engagement feature 50 (FIG. 14A, FIG. 14B) and a generally ellipsoidal retention feature 49. The ellipsoidal nature of these two features permits placement of the ellipsoidal engagement feature 50 into the retention feature 49 when the two ellipsoids are generally aligned and subsequent distalization of the engagement feature 50 within the retention feature 49 secures the engagement feature 50.

Figure 8:
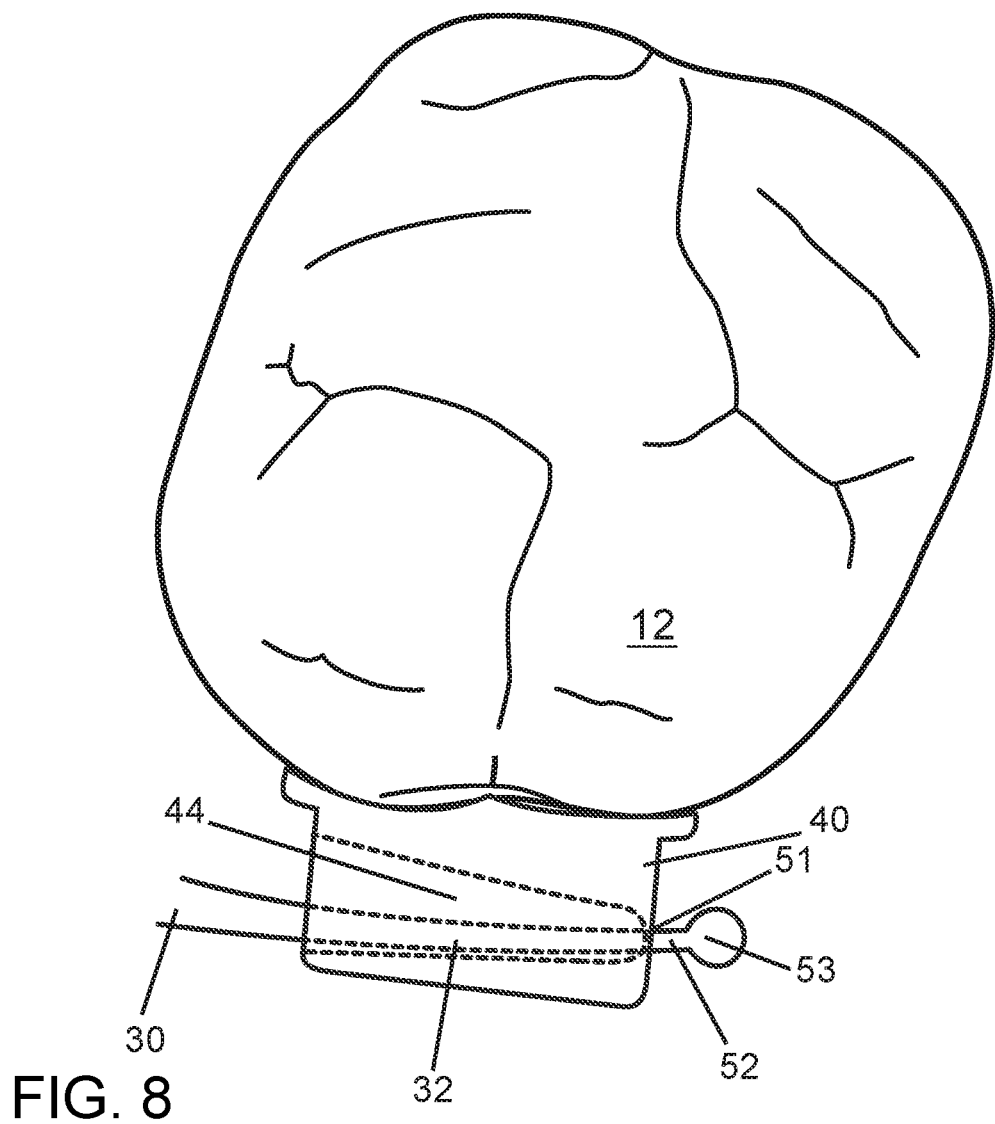
FIG. 8 is an occlusal view of an upper molar tube of a sliding distalizer, with a cross-section showing a distal rod end engaging the upper molar tube and passing through an aperture in a distal portion of the upper molar tube, in accordance with yet another embodiment of the present invention.

In another embodiment shown in FIG. 8, the molar tube 40 has an aperture or hole 51 at the back base of the tapered bottom of the interior 44. The aperture 51 is sized such that the distal end portion of rod 30 frictionally engages the molar tube 40 at aperture 51 such that when rod 30 is moved distally by force of an elastic from the hook causes molar tube 40 to also move distally, with the attached molar 12. In some embodiments rod 30 has a tapered portion 32 such that a distal tip 52 thereof fits through aperture 51. The rod 30 has a blocking feature 53 affixed to distal tip 52 thereby preventing the rod 30 from being removed from the molar tube 40, such as during chewing, etc. The blocking feature 53 may be crimped-on the rod, or threaded and likewise the rod 30 may also be threaded at tip 52 permitting the blocking feature 53 to be screwed onto the rod 30 after placement through the aperture 51. Alternatively, the blocking feature 53 may be integrally formed or welded to the rod 30 at tip 52 during manufacture of the appliance.

Figure 9:
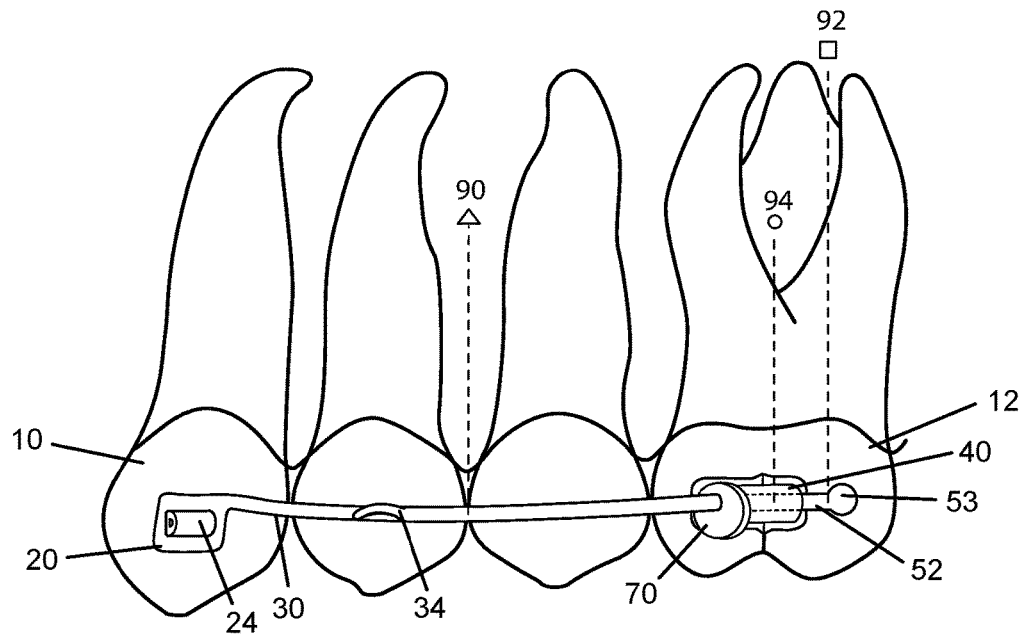
FIG. 9 is a buccal view of the upper middle and posterior teeth with a sliding distalizer featuring an orthodontic tube, a hook located on the rod, and a buccal push flange lever, with the centers of resistance of the maxillary dentition, the maxillary first molar, and the maxilla or upper jaw, in accordance with yet another embodiment of the present invention.
Figure 10A:
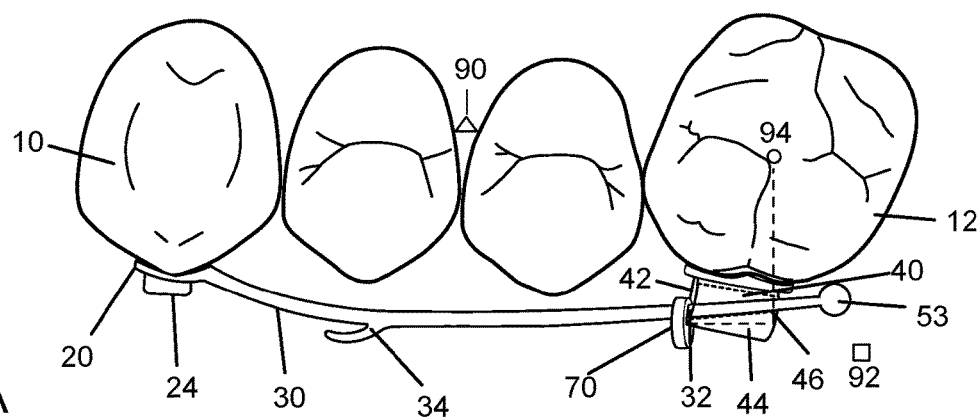
FIG. 10A is an occlusal view of the sliding distalizer of FIG. 9 on the upper teeth, with a middle cross-sectional view through the molar tube at an initial phase.

Turning now to FIG. 9, which shows a side-view of the upper middle and posterior teeth with a sliding distalizer in accordance with yet another embodiment of the present invention. An angled, rhomboid-shaped, or generally rectangular attachment bracket 20 is affixed to a canine tooth 10. The attachment bracket 20 features an orthodontic tube 24 suitable for placing a separate sectional archwire (not shown) through to two posteriorly-located premolar brackets (not shown) that may be placed above or below rod 30. This produces an anterior anchorage segment in order to prevent the aesthetic complication of canine over-eruption. Canine over-eruption is directly due to the vertical vector of the elastic traction force to the hook located at the anterior end of prior art distalizers. This results in a long lever arm away from the center of resistance of the anchoring molar 94 (in FIG. 9) producing a significant moment of extrusive force on the canine, with the prior art. The attachment bracket 20 may be integrally formed at the mesial of the curved, long rod 30 that extends towards the back of the mouth in a mesiodistal direction. Alternatively, the attached canine tube 24 may be a separate component welded, brazed, or form-molded into the attachment bracket 20 acting as a bonding pad to tooth enamel, and suitably affixed to a mesial of rod 30. The long rod 30 has a hook 34 to attach a separate traction force elastic to a lower molar at a diagonal in order to exert direct force from the hook on the rod to usually the distal wall of the molar tube. The hook 34 is smooth in order to reduce catching of the hook 34 on the inside of the patient's cheek. In some embodiments, the hook 34 is located on the rod portion of long rod 30. With reference to FIG. 9 and FIG. 10A, the entire maxillary dentition center of resistance (CR) 90, the actual localized upper molar CR 94, and the upper jaw or maxilla CR 92 which is located near the area of the sutural connection between the maxilla with the zygoma (cheek bone), the latter CR 92 positioned approximately above the posterior roots of the upper molars, are identified. The positioning of hook 34 on rod 30 substantially on the rod portion is advantageous as the hook 34 is closer anterior-posteriorly to the CR of the molar 94, and to the CR of the maxilla 92. The hook 34 positioning also improves the opportunity for more bodily translation of the upper molar 12 to reduce molar tipping. The hook 34 positioning additionally improves the restriction of maxillary growth by being closer to the center of resistance of the maxilla 92 when heavy elastic traction force is imparted directly on the hook 34 by the traction elastic. The hook provides another advantage imparting indirect force and away from the canine anterior end that in the prior art contributed to the complication of canine-over eruption (dracula-canine) appearance with direct elastic placement to the canines.

Turning back to FIG. 9, also depicted is a buccal push flange lever 70 located on a distal portion of the rod 30 proximal to mesial edges of the buccal wall 47 (FIG. 11A) and later in treatment proximal to the lingual wall 48 of molar tube 40. Buccal push flange lever 70 may be integrally formed with rod 30 or may be a separate component welded, brazed or affixed to rod 30 by any suitable means.

Turning back to FIG. 7A, FIG. 7B, and FIG. 7C in addition, a buccal push flange lever (not shown, 70 in FIG. 9) can be applied on the rod portion mesial of the molar tube 40 wherein the buccal push flange lever would contact the mesial of the molar tube first before the sphere 50 abuts against the back wall of the molar tube.

Figure 10B:
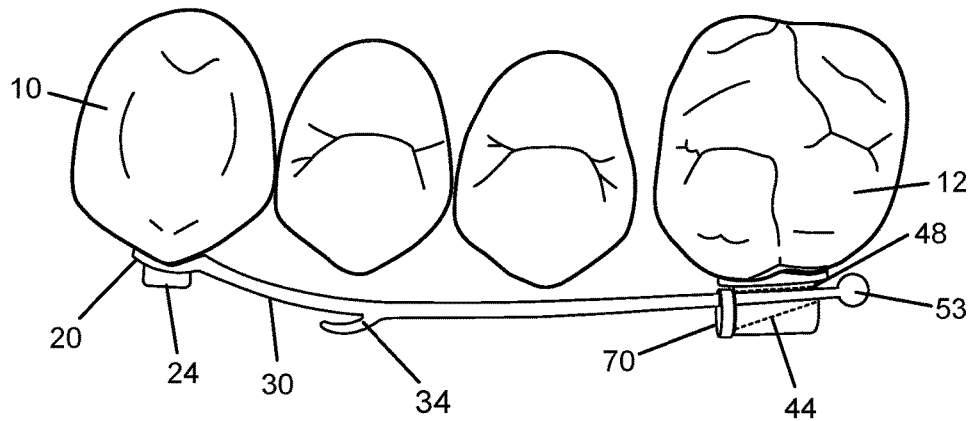
FIG. 10B is an occlusal view of the sliding distalizer of FIG. 9 on the upper teeth, with a middle cross-sectional view through the molar tube, that shows a distalization with mild lingual movement of the distal aspect of the molar.

FIG. 10A is an occlusal view of the sliding distalizer on the upper teeth at an initial phase, while FIG. 10B is an occlusal view of the sliding distalizer on the upper teeth that shows a distalization of molar 12. As shown, buccal push flange lever 70 is buccally offset with respect to rod 30. Accordingly, when the distalizer is moved distally towards molar 12 by action of the external traction force elastic, buccal push flange lever 70 engages the mesial edge of buccal wall imparting a distalization and rotation force on molar 12. Advantageously, due to the longer distance between the buccal wall and that of the molar centre of resistance 94, FIG. 10A, the moment of force about molar 12 is increased (FIG. 10A), thus less force by the elastic traction force is needed to distalize the molar 12. Furthermore the buccal push flange lever 70 is closer to the center of resistance of the maxillary dentition 90 (observed in FIG. 9, and FIG. 10A) than prior art contact in the molar tube that was more posterior to CR 90. In addition, the buccal push flange lever 70 is closer to the center of resistance of the maxilla 92 because it is located closer to the cheek as well, observed in FIG. 10A to restrict skeletal maxillary growth.

Figure 10C:
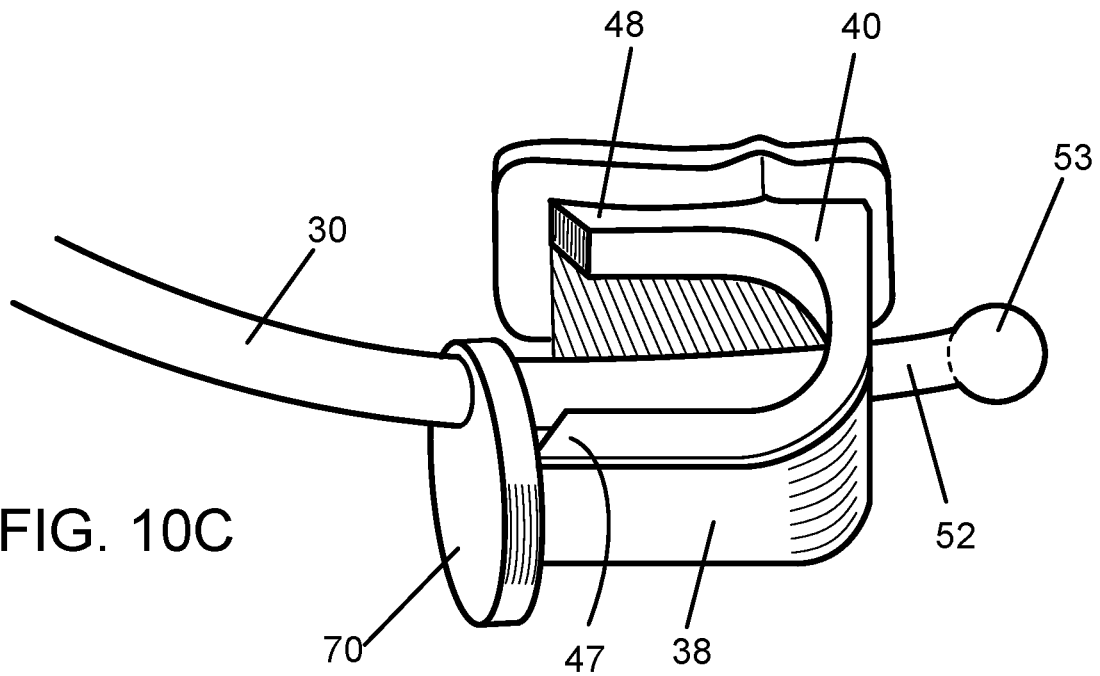
FIG. 10C is a perspective side view of a distal rod end of a sliding distalizer featuring a buccal push flange lever coupled to an upper molar tube with the top gingival wall of the molar tube removed, showing the retention void in the form of a C-clasp having an aperture in the molar tube in accordance with yet another embodiment of the present invention.
Figure 11A:
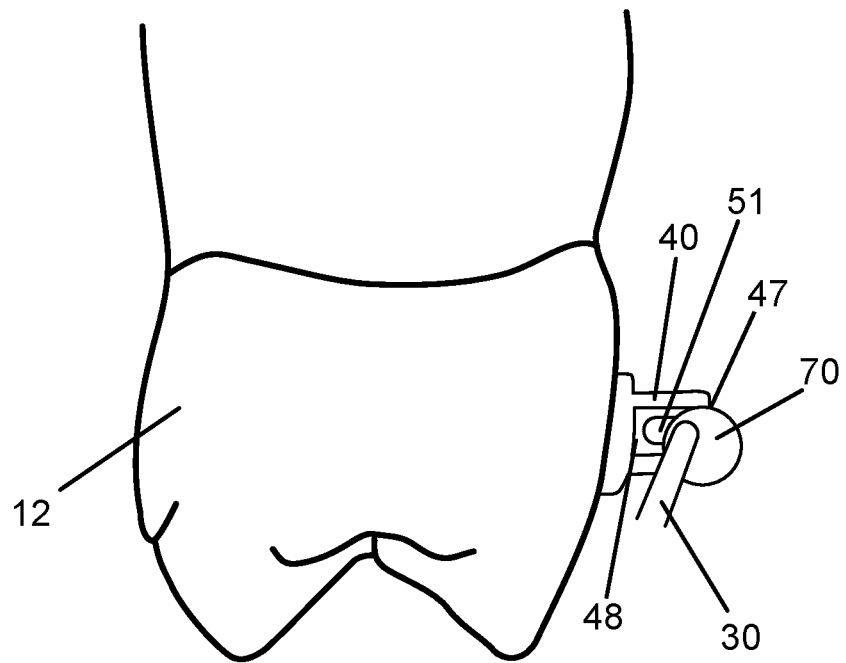
FIG. 11A is a mesial view showing the engagement feature of FIG. 9, FIG. 10A, FIG. 10B, and FIG. 10C in relation to a molar tooth.
Figure 11B:
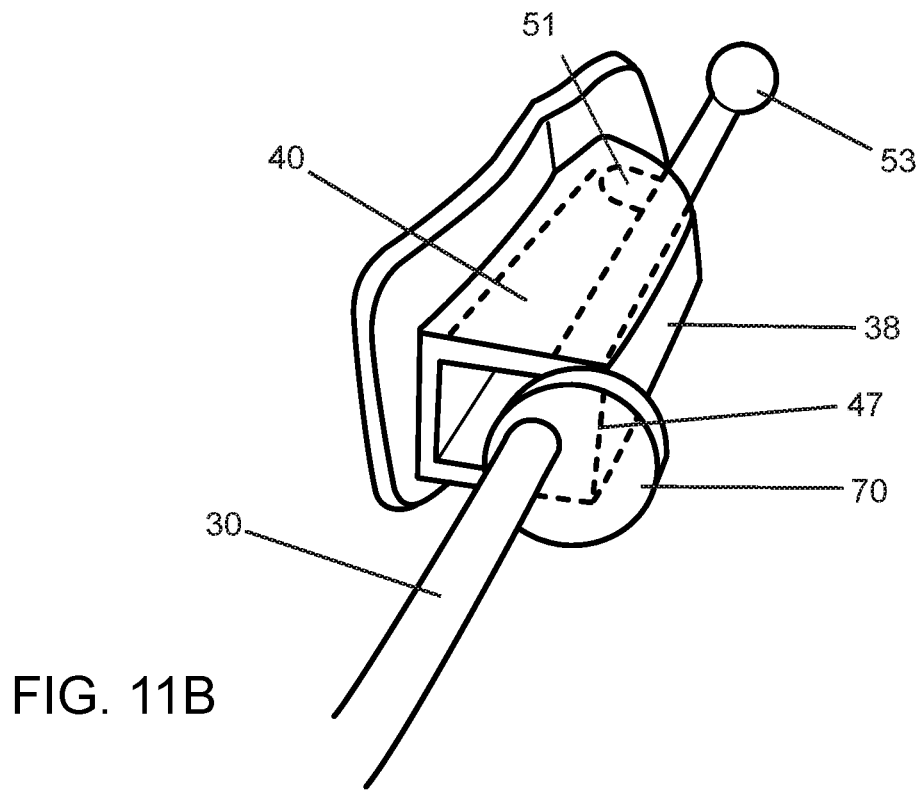
FIG. 11B is a mesial perspective view showing the distal rod end coupled to the upper molar tube of the sliding distalizer of FIG. 9, FIG. 10A, and FIG. 10B.
Figure 12:
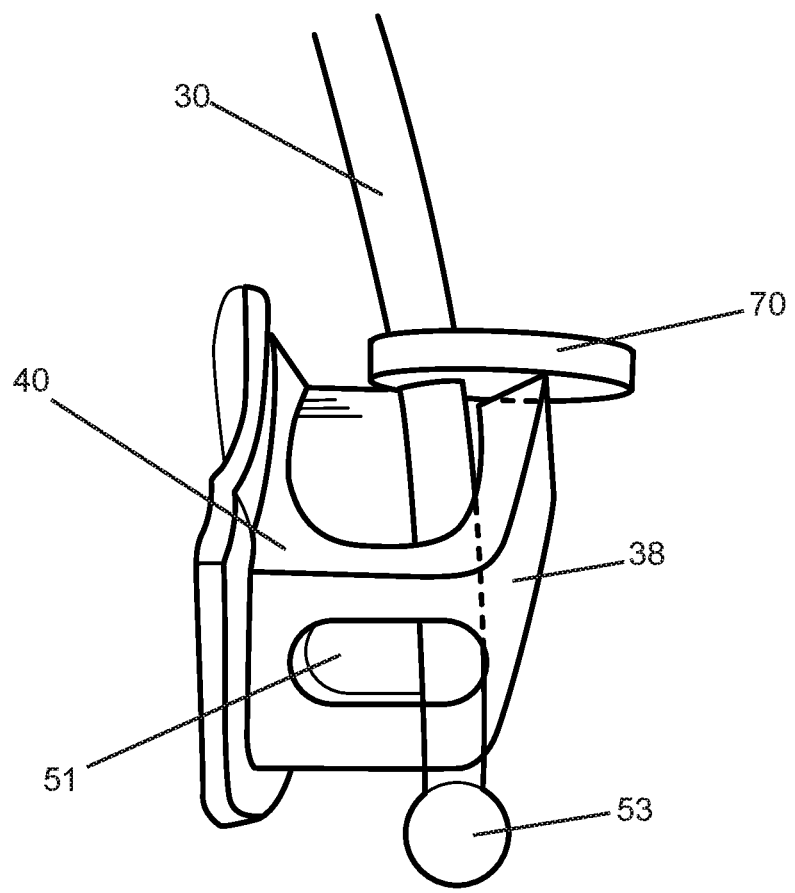
FIG. 12 is a distal perspective view showing the engagement feature of the sliding distalizer of FIG. 10C.
Figure 13:
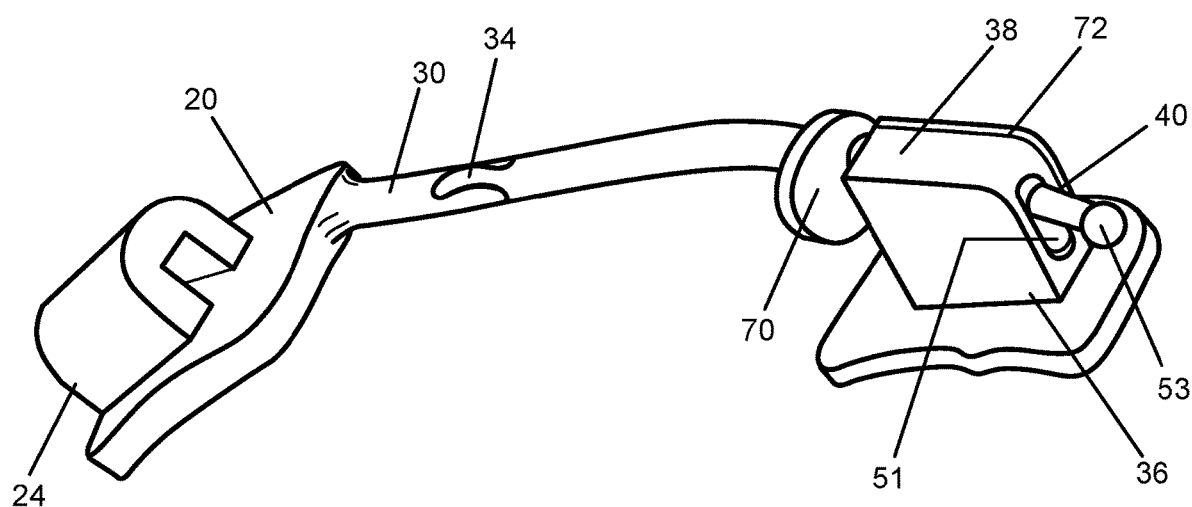
FIG. 13 is perspective buccal-gingival view of a sliding distalizer featuring the upper molar tube of FIG. 11B.

FIG. 10C is a buccal perspective view of an engagement feature of a sliding distalizer featuring a buccal push flange lever, and FIG. 12 is a distal perspective view of the engagement feature, in accordance with yet another embodiment of the present invention. FIG. 13 is perspective buccal-gingival view of a sliding distalizer featuring the upper molar tube of FIG. 11B. With reference to FIG. 10C, FIG. 12, and FIG. 13, in some embodiments the mesial edges 47 of buccal wall 38 in FIG. 11A, and lingual wall 48 in FIG. 10C and FIG. 11A are flared. In such embodiments, buccal push flange lever 70 engages a buccal tip of the mesial edge of the buccal wall, further increasing the moment of force as explained earlier. In this embodiment molar tube 40 is C-shaped and has a generally elliptical aperture suitable for receiving rod 30.

In other embodiments, buccal push flange lever 70 engages the molar tube at both the mesial edge 47 of the buccal wall 38 and later following some distalization, the mesial surface of the lingual wall 48. In other embodiments, buccal wall 38 is shorter mesiodistally than lingual wall 48. Buccal push flange lever 70 can be angled towards the buccal wall 38 with respect to rod 30.

Figure 14A:
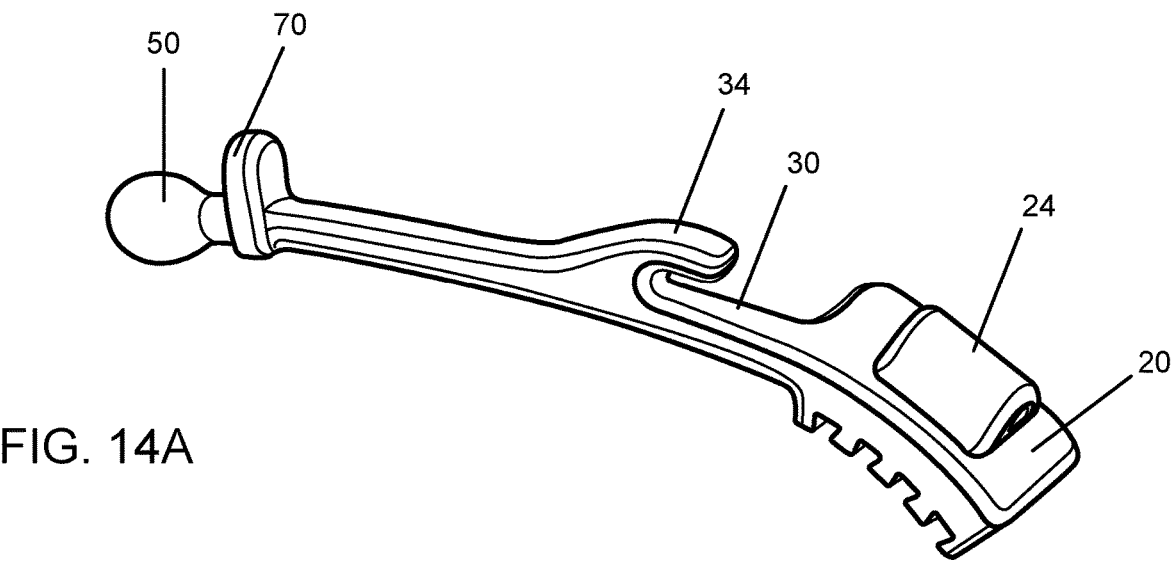
FIG. 14A is a buccal-occlusal perspective view of a sliding distalizer featuring a centrally located canine tube on the canine bracket attachment or bonding pad portion, a hook and a buccal push flange lever, in accordance with another embodiment of the present invention.
Figure 14B:
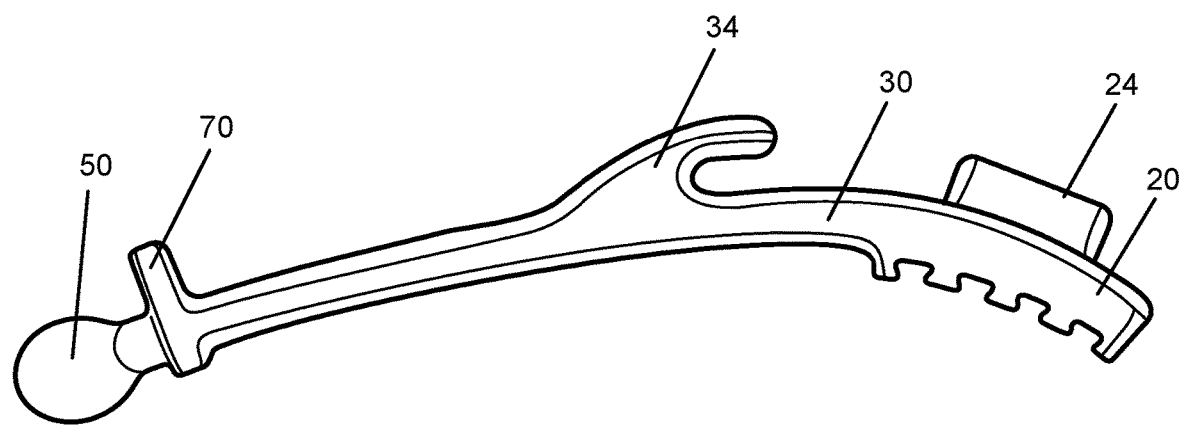
FIG. 14B is an occlusal side view of the sliding distalizer.

FIG. 14A is a perspective view of a sliding distalizer featuring a centrally located hook, an orthodontic tube, and a buccal push flange lever, in accordance with another embodiment of the present invention; and FIG. 14B is a side view of the sliding distalizer of FIG. 14A. With reference to both FIGS. 14A and 14B, an attachment bracket component 20 suitable for being affixed to a canine tooth is shown. Attachment bracket 20 features an orthodontic tube 24 integrated via welding, brazing or form-molding suitable for supporting an archwire therethrough. Attachment bracket 20 may be formed at one portion of a rod 30. Rod 30 has an integrated hook 34 formed thereon. A buccal push flange lever 70 is formed at the rod 30 opposite the attachment bracket. An engagement feature 50 is located at a distal end of rod 30. Engagement feature 50 is in the form of an ellipsoid, and is suitable for coupling with a retention feature having the shape of an ellipsoid void, for retaining the distal end of rod 30 in a molar tube (not shown).

Although the interior 44 of the molar tube 40 is shown as a void, the void may be filled with a compressible material such as lubricant, polycarbonate, wax, foam or rubber in order to adjust the amount of distalization force on the molar 12. Alternatively, the interior 44 of the molar tube 40 may be coated with a material such as wax to increase the friction to reduce slippage between the rod 30 and the interior 44 or to the maintain the components in position during initial bonding of the entire appliance.

In yet another alternative, the molar tube 40 may have an opening on the distal side permitting a tapered end 32 of the rod 30 to exit out through this opening.

Although the embodiments shown herein show a tapered end 32 to the rod 30 and a tapered interior of the molar tube 44, from mesial to distal it is also possible to have other shapes to initiate a lateral sliding force to be exerted on the molar 12.

Although the embodiments shown herein demonstrate the distal section of the rod may be seated into the molar tube from an occlusal direction there may be instances the rod can also be seated into the molar tube from the gingival direction where a separate gingival cap 72 can possibly be laser-welded, or brazed to the molar tube 40 to secure the rod segment into the molar tube as shown in FIG. 13.

In some embodiments, the interior of the molar tube may be cone-shape, funnel (FIGS. 1-6), keyhole shape (FIGS. 7A-7C), or sinusoidal in FIG. 7D, a pyramid, a prism, or a funnel. For example, the interior may be a triangular prism or pyramid, a rectangular pyramid or prism, or other shape of pyramid or prism known in the art. The interior and exterior edges of the cone, funnel, keyhole, sinusoidal, funnel, pyramid or prism may be smoothed including at the corners, or chamfered to reduce edges that may prevent interference with rod movement, or prevent irritation inside the mouth respectively.

Although the embodiments herein show a distalizer for the patient's left-handed side of the mouth, the distalizer may be inverted to provide a distalizer for the right-hand side of the mouth.

Although the embodiments herein show a distalizer for Class II correction, the distalizer can be placed on the lower canine and lower molar for Class III correction with a separate traction elastic attached to a separate button attachment at the upper first molar.

Although the embodiments here demonstrate the orthodontic appliance placed on a canine and a molar, the orthodontic appliance may be made shorter so that is may be applied to different pairs of teeth. In another alternative, the attachment bracket may be placed on a mesial tooth with suitable root strength, and the molar tube may be possibly placed on any suitable distal tooth.

The embodiments described herein are only examples and are not intended to limit the claims. One of skill in the art would be able to adapt the description herein and substitute equivalent elements performing the same or similar function.

The invention claimed is:

1. An orthodontic appliance for orthodontic treatment of a posterior maxillary sector extending from a canine tooth to a molar tooth on the same side of the maxilla, comprising:
   a molar tube affixable to the molar tooth and having an opening on the mesial side to an interior of the molar tube;
   a canine attachment bracket component affixable to the canine tooth;
   a curved rod extending from the canine attachment bracket component towards the molar tube in a mesiodistal direction, the curved rod comprising an engagement feature coupled to a retention feature of the molar tube, a distal end of the curved rod engaging the interior of the molar tube;
   a hook, located on the canine attachment bracket component or on the curved rod, for attachment to a traction elastic; and
   a push flange lever, located at a distal end of the curved rod for engaging a mesial end of the molar tube to exert a distal force on the molar tooth when under a force of the traction elastic on the hook;
   wherein the push flange lever engages the mesial end of the molar tube before the engagement feature abuts a back wall of the molar tube.

2. The orthodontic appliance according to claim 1, wherein the molar tube opening is rectangular with rounded corners.

3. The orthodontic appliance according to claim 1, wherein the interior of the molar tube tapers in a mesiodistal direction from the opening.

4. The orthodontic appliance according to claim 1, wherein the molar tube opening is narrower in an occlusal-gingival direction than in a buccal-lingual direction.

5. The orthodontic appliance according to claim 1, wherein the opening narrows in the buccal-lingual direction and in the mesial to distal direction, and the opening is relatively rectangular in shape through a cross-sectional view in an occlusal-gingival direction.

6. The orthodontic appliance according to claim 1, wherein the curved rod engages a tapered end of the interior of the molar tube.

7. The orthodontic appliance according to claim 1, further comprising a restriction feature maintaining the engagement feature within the retention feature.

8. An orthodontic appliance for orthodontic treatment of a posterior maxillary sector extending from a canine tooth to a molar tooth on the same side of a maxilla, comprising:
   a molar tube affixable to the molar tooth and having an opening on the mesial side to an interior of the molar tube and an aperture on the distal side;
   a canine attachment bracket affixable to the canine tooth;
   a curved rod extending from the canine attachment bracket in a mesiodistal direction;
   a hook, located on the canine attachment bracket or on the curved rod, for attachment to a traction elastic;
   wherein the curved rod passes through the molar tube entering at the opening and exits at the aperture;
   wherein a distal end portion of the curved rod frictionally engages the molar tube to exert a distal force on the molar tooth when under force of the traction elastic on the hook;
   and wherein a tapered end of the curved rod initially aligns with the buccal wall of the molar tube and during treatment becomes aligned with a lingual wall of the molar tube.

9. The orthodontic appliance according to claim 8, further comprising a blocking feature at a distal end of the curved rod for preventing the curved rod from being removed from the molar tube.

10. The orthodontic appliance according to claim 9, wherein the curved rod tapers at the distal end.

11. The orthodontic appliance according to claim 8, wherein the canine attachment bracket comprises an orthodontic tube containing an archwire slot therethrough in the mesiodistal direction, the archwire slot being sized for permitting the insertion of an archwire to pass mesiodistally from the canine attachment bracket into at least one premolar bracket.

12. The orthodontic appliance according to claim 8, further comprising a push flange lever, located at the distal portion of the curved rod for engaging a mesial end of the molar tube when the curved rod is moved distally under the force of the traction elastic on the hook.

13. The orthodontic appliance according to claim 12, wherein the push flange lever is offset with respect to the curved rod such that the push flange lever engages a mesial edge of a wall of the molar tube when the curved rod is moved distally under the force of the traction elastic.

14. An orthodontic appliance for orthodontic treatment of a posterior maxillary sector extending from a canine tooth to a molar tooth on the same side of the maxilla, comprising:
   a molar tube affixable to the molar tooth and having an opening on the mesial side to an interior of the molar tube;
   a canine attachment bracket affixable to the canine tooth;
   a curved rod extending from the canine attachment bracket towards the molar tube in a mesiodistal direction, the curved rod comprising an engagement feature coupled to a retention feature of the molar tube;
   a hook, located on the canine attachment bracket or on the curved rod, for attachment to a traction elastic; and
   a push flange lever, located at a distal end of the curved rod for engaging a mesial end of the molar tube to exert a distal force on the molar tooth when under a force of the traction elastic on the hook;
   wherein the push flange lever engages the mesial end of the molar tube before the engagement feature abuts a back wall of the molar tube.

15. The orthodontic appliance according to claim 14, wherein the hook is located on the curved rod between the canine attachment bracket and the molar tube.

16. The orthodontic appliance according to claim 15, wherein the hook is located on a curved portion of the rod.

17. The orthodontic appliance according to claim 14, wherein the canine attachment bracket comprises an orthodontic tube containing an archwire slot therethrough in the mesiodistal direction, the archwire slot being sized for permitting the insertion of an archwire to pass generally mesiodistally from the canine attachment bracket into at least one premolar bracket.

18. The orthodontic appliance according to claim 14, wherein the push flange lever is offset with respect to the curved rod such that the push flange lever engages a mesial edge of a wall of the molar tube when the curved rod is moved distally under the force of the traction elastic.

19. The orthodontic appliance according to claim 14, wherein the engagement feature has a spherical shape and, wherein the retention feature is a spherical void sized slightly larger than the engagement feature.

20. The orthodontic appliance according to claim 14, wherein the engagement feature has a ellipsoidal shape and the retention feature is a generally ellipsoidal void sized slightly larger than the engagement feature.

21. The orthodontic appliance according to claim 14, wherein the engagement feature is D-shaped and the retention feature is a generally sinusoidal void with at least two chambers sized slightly larger than the engagement feature.

* * * * *